Oct. 21, 1958    H. KNÜTTEL    2,856,823
DUPLICATING MACHINE
Filed Dec. 22, 1954    2 Sheets-Sheet 1
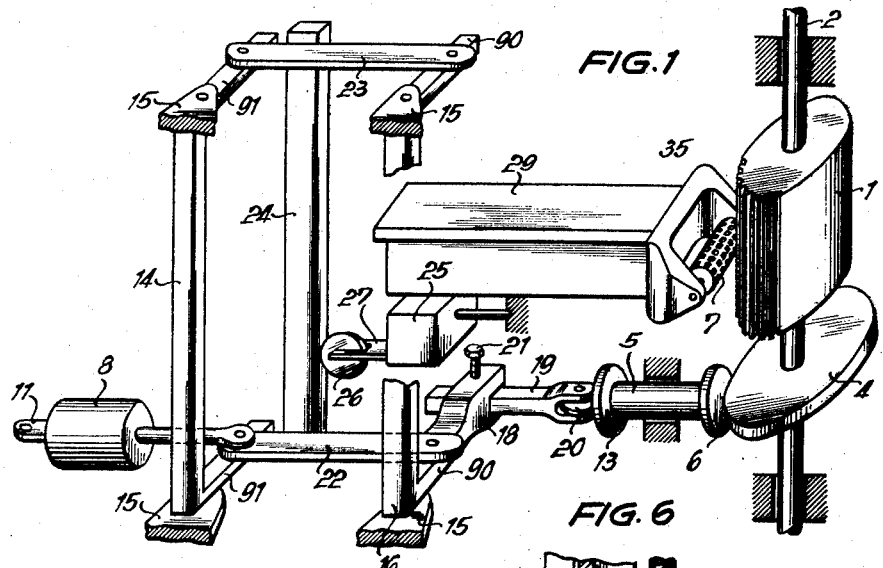
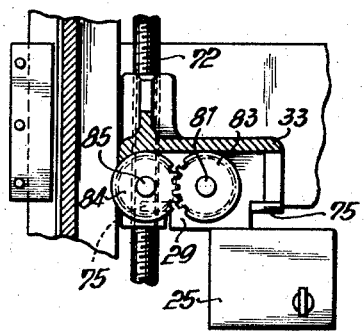
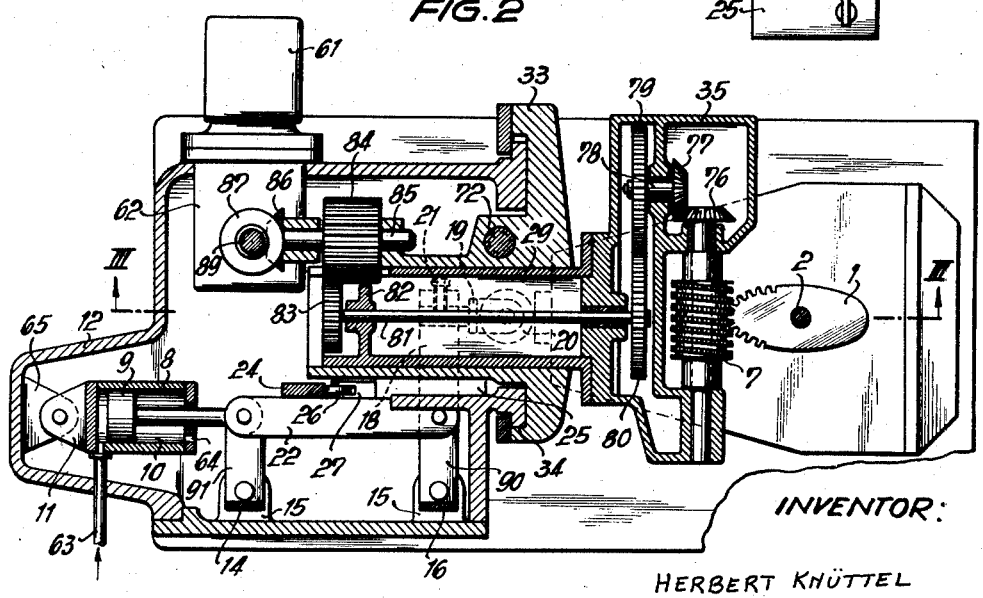
INVENTOR:
HERBERT KNÜTTEL
BY:
Michael S. Striker
Agt.

Oct. 21, 1958 — H. KNÜTTEL — 2,856,823
DUPLICATING MACHINE
Filed Dec. 22, 1954 — 2 Sheets-Sheet 2

INVENTOR:
HERBERT KNÜTTEL
BY:

United States Patent Office 2,856,823
Patented Oct. 21, 1958

2,856,823

DUPLICATING MACHINE

Herbert Knüttel, Mannheim-Waldhof, Germany, assignor to Firma Bopp & Reuther G. m. b. H., Mannheim-Waldhof, Germany Application December 22, 1954, Serial No. 476,972

9 Claims. (Cl. 90—2)

The present invention relates to duplicating machines, and more particularly to duplicating machines which are adapted, for example, to manufacture such articles as elliptical gears and the like from an elliptical template, for example.

Known duplicating machines of this type have several disadvantages. Thus, with the known machines the template has the exact size of the finished article so that inaccuracies in the template are repeated in the finished articles. Also, with the known machines the feeler which engages the template is urged toward the same with a large force corresponding to the force with which the cutting tool engages the work piece. This results not only in excessive and rapid wear of the template but also in the necessity of large forces for moving the template as well as the work piece.

One of the objects of the present invention is to overcome the above drawbacks by providing a duplicating machine which moves the cutting tool in correspondence to the movement of the feeler but through only a fraction of the distance that the feeler moves so that inaccuracies in the template, instead of being transferred to the finished article, will be reduced in the finished article or will not be present in the finished article.

Also, it is an object of the present invention to maintain the feeler against the template with an exceedingly small force, as compared to forces used in conventional duplicating machines for this purpose, so that the template and the feeler will be assured of a long life and so that the force required to move the template and work piece will be much less than with conventional duplicating machines.

It is also an object of the present invention to transfer the movement of the feeler to the cutting tool with a hydraulic mechanism.

A further object of the present invention is to provide a single means for maintaining a parallelogram linkage in engagement with the feeler and the feeler in engagement with the template.

An additional object of the present invention is to provide an elliptical gear manufacturing machine capable of accomplishing all of the above objects.

Furthermore, it is an object of the present invention to provide structure, for accomplishing the above objects, which is made up of simple and ruggedly constructed parts which are very reliable in operation and which are easy to assemble and disassemble.

The objects of the present invention also include a duplicating machine which may be easily adjusted to accommodate work pieces of different sizes.

With the above objects in view, the present invention consists of a duplicating machine which includes a support means for supporting a template and a work piece for movement together and a feeler means engaging the template to be moved thereby in accordance with the shape of the template. A cutting means is provided for cutting the work piece, and a means connects the cutting means to the feeler means for movement in correspondence to the movement imparted to the feeler means by the template through a distance which is a fraction of the movement of the feeler means and with a force greater than that with which the feeler means engages the template.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a fragmentary schematic illustration of the principal parts of the structure of the invention illustrating the manner in which these parts operate;

Fig. 2 is a sectional view taken along line II—II of Fig. 3 in the direction of the arrows and illustrating the details of one possible apparatus constructed in accordance with the present invention;

Fig. 6 is a view taken along the line VI—VI of Fig. 3 in the direction of the arrows.

Figure 3:
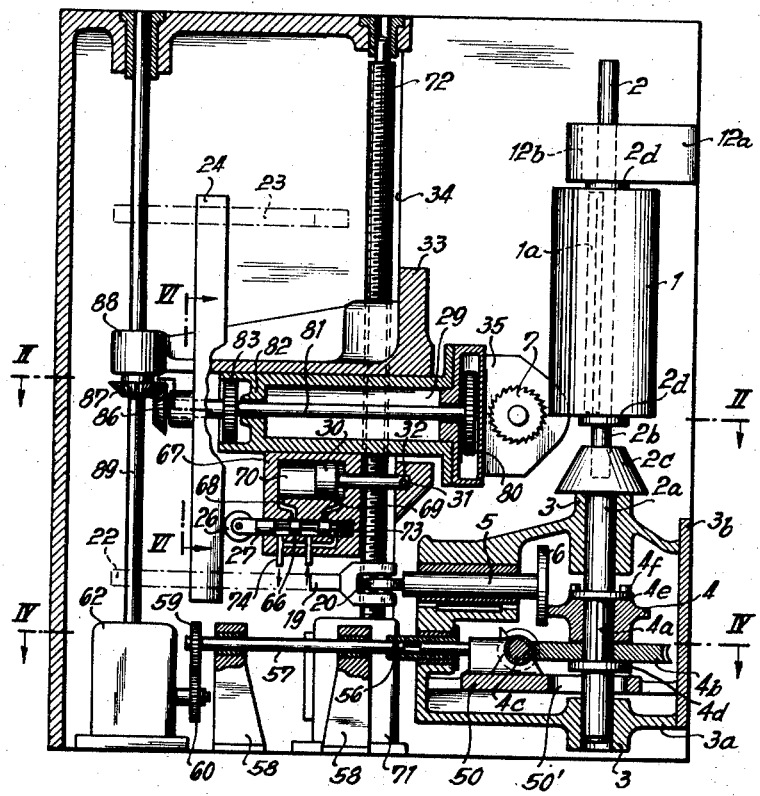
Fig. 3 is a sectional elevational view taken along line III—III of Fig. 2 in the direction of the arrows and showing the hydraulic apparatus of the invention in section in a different plane than the section on which the remainder of Fig. 3 is taken.
Figure 5:
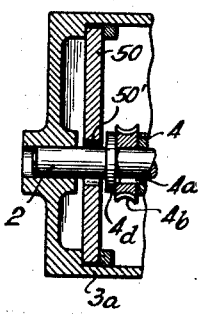
Fig. 5 is a view taken along line V—V of Fig. 4 in the direction of the arrows.

Referring now to the drawings, and to Fig. 1 in particular, it will be seen that the template 4 having the shape of an elliptical gear, in the particular machine illustrated, is fixed to the shaft 2 for rotation therewith, this shaft 2 being supported by bearings diagrammatically shown in Fig. 1 for rotation about its axis. A work piece 1 is also fixed to the shaft 2 for rotation therewith. This work piece 1 may be made up of a plurality of superposed gear blanks. A feeler means 5 is supported for movement along a straight line normal to the axis of shaft 2, and this feeler means 5 has an end portion 6 engaging the periphery of the template 4 and an enlarged end 13 engaging a roller 20.

The roller 20 is turnably carried by the forked end of a bar 19 which extends slidably through a cut-out formed in an extension 18 of a U-shaped member 16 turnably carried by stationary parts 15 for turning movement about an axis parallel to the shaft 2. A U-shaped member 14 identical with member 16 is carried by an additional pair of stationary parts 15 for turning movement about an axis parallel to the shaft 2, and the members 14 and 16 are interconnected by links 22 and 23 so that these links and the parts 14–16 form a parallelogram linkage. A set screw 21 fixes the bar 19 in an adjusted position to the extension 18 of the U-shaped member 16.

A pressure means 8, which may be in the form of a cylinder and piston operated by air under pressure, is connected to the link 22 to urge the parallelogram linkage toward the end 13 of feeler 5 and to also urge end 6 of the feeler 5 into engagement with the template 4, so that the single yieldable means 8 maintains the linkage in engagement with the feeler and the feeler in engagement with the template.

A guide bar 24 is parallel to shaft 2 and is fixed to the links 22 and 23. A roller 26 engages the right side face of guide bar 24, as viewed in Fig. 1, and this roller 26 is turnably carried by an operating portion 27 of a slide valve which controls a hydraulic means 25 connected to the cutter support means 29 for shifting the latter back and forth in correspondence with the movement of the feeler means 5.

The details of the structure of the invention are described below in connection with Figs. 2–6. However, the principle of the invention may be seen from the schematic illustration of the structure shown in Fig. 1. Thus, by a structure described below the gear cutter 7 carried by the carrier 29 is shifted up and down while the shaft 2 together with work piece 1 and template 4 turn about the axis of shaft 2. As template 4 turns the feeler 5 will be shifted toward or away from the axis of shaft 2, and this movement will be transmitted through bar 19 and extension 18 to the parallelogram linkage 14—16, 22, 23. Thus, it will be seen that the guide bar 24 will be shifted during movement of the parallelogram linkage, and the movement of the guide bar 24 will be transmitted by valve-operating means 26, 27 to a slide valve which controls the hydraulic means 25 in such a way that the tool carrier 29 is shifted toward and away from the axis of shaft 2 in correspondence to the movement of the feeler 5. Thus, the arrangement shown in Fig. 1 automatically positions the cutter 7 so that it will cut the work piece 1 according to the shape of the template 4.

However, it will be noted that the force of the hydraulic means which is applied to the carrier 29 is completely separated from the force with which the yieldable means 8 urges the feeler against the template. As a result, the force between feeler and template can be quite small while the force applied to tool carrier 29 can be quite large. In actual machines made in accordance with the present invention the force required to be applied by the means 8 to the feeler 5 for maintaining the latter in engagement with template 4 was a very few grams while with conventional machines this force amounts to several hundred kilograms.

Furthermore, it will be noted that the extension 18 allows the feeler to move back and forth through much greater distances than the guide arm 24 which moves back and forth with the feeler. As a result, the carrier 29 which may be controlled by the hydraulic apparatus 25 to move back and forth through substantially the same distance as guide arm 24 will also move in correspondence to the feeler 5 but through only a fraction of the distance that the feeler moves. As a result of this feature, inaccuracies in the template are not repeated in the work piece; instead they are reduced or eliminated entirely.

Thus, it will be seen on the one hand that the structure of the invention greatly reduces the force with which the feeler is applied to the template so that in addition to a longer life of the feeler and template a lesser force is required to rotate the shaft 2, and on the other hand that the movement of the feeler is greater than the movement of the cutting tool so that inaccuracies of the template are not repeated to the same extent in the finished article. Instead of a hydraulic apparatus and a parallelogram linkage it is possible to accomplish the results of the invention with other structures, although the description is limited to a machine which uses a parallelogram linkage and hydraulic structure cooperating together to interconnect the cutter carrier and feeler in such a way as to move the carrier in correspondence to the movements imparted to the feeler by the template.

The details of the structure schematically illustrated in Fig. 1 are shown in Figs. 2–6. Thus, referring to Figs. 2 and 3, it will be seen that the shaft 2 extends turnably through bearings 3 of a housing 3a having a removable cover 3b giving access to the interior of the housing 3a. The template 4 may be constrained to rotate with the shaft 2 by a key 4a. The shaft 2 is composed of two parts 2a and 2b, and the top end of part 2a is enlarged at 2c and rests on the top face of the top bearing 3. The enlargement 2c is formed with a splined bore extending into the same from the top face thereof and the bottom end of shaft portion 2b is splined and extends into the splined bore so as to be in driving engagement with shaft portion 2a. The shaft portion 2b extends freely through a bore in a stationary part 12a so as to be rotatable in this bore, and the shaft portion 2b has a pair of collars 2d fixed thereto by set screws or the like, the work piece 1 being located between these collars 2d and being keyed to the shaft 2 for rotation therewith. The bore in member 12a communicates with a groove 12b through which the key 1a fixed to shaft 2 may pass. When the cutting of the work piece is completed, the collars 2d are loosened from the shaft portion 2b and this latter shaft portion is simply raised upwardly together with key 1a through the member 12a so as to separate the work piece 1 from the shaft 2. Of course, if this work piece 1 is made up of a plurality of superposed blanks then they are separated in the same way from the shaft. The mounting of the work piece on the machine takes place with the reverse of these steps, that is, with the work piece 1 and collars 2d held substantially as shown in Fig. 3 the shaft 2b is slipped down through the collars and work piece, these collars being provided with cutouts through which the key 1a passes, and then the collars 2d, or at least the lowermost collar 2d of Fig. 3, are fixed to the shaft 2b by a set screw or the like.

Directly beneath the template 4 on the shaft 2 a worm wheel 4b is keyed to the shaft also by key 4a, at part 2a thereof so that the worm wheel and shaft turn together. Worm wheel 4b rests on a collar 4d fixed to shaft portion 2a. A ring 4e on the top face of template 4 is formed with openings through which screws 4f extend. These screws extend completely through the template and worm wheel and threadedly engage collar 4d to hold the template and worm wheel together.

Figure 4:
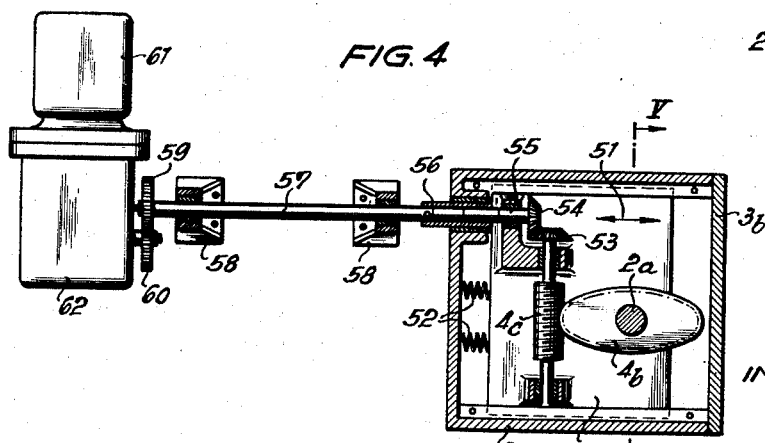
Fig. 4 is a view taken along line IV—IV of Fig. 3 in the direction of the arrows.

The cross sectional shape of the work piece 1 is evident from Fig. 2, and it is evident from Fig. 4 that the worm wheel 4b has a shape corresponding to that of the workpiece 1. Through this arrangement proper turning speed of the workpiece is guaranteed when the shaft 2 is driven through the worm wheel 4b. A worm 4c (Figs. 3 and 4) meshes with the worm wheel 4b and is turnably carried by suitable bearings fixed to and extending upwardly from the top face of a plate 50 whose side edges are guided in suitable guides (Fig. 5) formed in the side walls of housing 3a for movement to the right and left, as viewed in Figs. 3 and 4, and as indicated by the double headed arrow 51. Springs 52 engage the left edge of plate 50 and the left wall of housing 3a to urge plate 50 to the right, as viewed in Figs. 3 and 4, so as to maintain the worm 4c in mesh with the worm wheel 4b during rotation of the latter. Plate 50 is formed with an elongated slot 50′ through which the shaft 2 freely extends. A bevel gear 53 is fixed to a free end of the worm 4c and meshes with a bevel gear 54 fixed to a shaft 55 extending through a bearing fixed to and extending from the top face of the plate 50. The left free end of shaft 55 is splined and mates with splines formed in the bore of a sleeve 56 turnably carried by a bearing formed in the left wall of housing 3a, as viewed in Figs. 3 and 4. The splined end of shaft 55 has a sliding fit in the splined bore of sleeve 56 so that the shaft 55 may slide axially with respect to sleeve 56 during movement of plate 50 under the influence of springs 52 to maintain worm 4c in engagement with worm wheel 4b, and in this way when the sleeve 56 is driven the drive will be transmitted to the shaft 2 during shifting of plate 50.

The sleeve 56 is driven by a shaft 57 which extends into and is fixed to the sleeve 56, this shaft 57 being turnably supported by bearings in the stationary posts 58 at the bottom of the machine, and a gear 59 is fixed to the left end of shaft 57, as viewed in Figs. 3 and 4. The gear 59 meshes with a gear 60 driven by the motor 61 through a suitable transmission 62.

Fig. 3 clearly shows the end 6 of feeler 5 which engages the template 4, and furthermore Fig. 3 shows how the feeler is rotatably supported in a bearing of the housing 3a. It will be noted that the left end of feeler 5 is not enlarged in Fig. 3. The enlargement 13 shown in Fig. 1 is not essential if the left end of the feeler, as viewed in Fig. 3, is large enough to remain in engagement with the roller 20 during turning of the parallelogram linkage.

Fig. 2 clearly shows the details of the yieldable means 8 for urging the parallelogram linkage together with roller 20 toward the feeler and the feeler toward the template. As is evident from Fig. 2, the yieldable means 8 includes a cylinder 10 in which the piston 9 is slidable, the piston rod of piston 9 extending through the right wall of cylinder 10, as viewed in Fig. 2, and being connected to the lower link 22 of the parallelogram linkage, as indicated in Fig. 1. Air or another fluid under pressure is moved into the cylinder 10 through the conduit 63, and the right wall of the cylinder 10 is formed with an opening 64 to maintain the space in cylinder 10 at the right side of piston 9, as viewed in Fig. 2, at atmospheric pressure. The left end wall of cylinder 10 is fixed to a lug 11 which is pivotally carried by a stationary bracket 65. Thus, during turning of the parallelogram linkage the cylinder may also turn. The conduit 63 for supplying fluid under pressure to the cylinder 10 is flexible so that it does not restrain the turning movement of the cylinder.

Fig. 3 shows the links 22 and 23 in dot-dash lines and also shows the guide bar 24 which is connected to the links 22 and 23 and is parallel to the shaft 2, as described above. Figs. 2 and 3 show the roller 26 in engagement with the right vertical face of the guide bar 24, as viewed in Figs. 2 and 3. As is evident from Fig. 3 in particular, the roller 26 is turnably carried by the valve operating member 27 which is directly fixed to the slide valve 66. This slide valve extends into a suitable bore of the housing 67 of the hydraulic apparatus 25, and as is shown in Fig. 3 this housing is formed with passages 68 and 69 communicating with the valve 66 and the cylinder 70 formed in the interior of the housing 67. A piston 30 is slidable in the cylinder 70, and the piston rod 31 extends slidably through a bore of housing 67 and is fixed at 32 to the carriage 33 which is vertically movable along the stationary guides 34 of the machine (Figs. 2 and 3). A motor 71 is carried by the machine and rotates a vertically extending screw 72 which extends through the carriage 33 in threaded engagement therewith so that upon operation of motor 71 the carriage 33 and all parts carried thereby are moved vertically.

A spring 73 in the housing 68 urges the valve 66 together with valve operating member 27 and roller 26 against the guide member 24. The housing 67 is also formed with passages 74 to guide fluid under pressure to and from the cylinder 70 in accordance with the position of valve 66 determined by the position of guide bar 24. As is apparent from Figs. 3 and 6 the hydraulic apparatus 25 is fixed to the underside of the carriage 29 carried by the carriage 33 and being horizontally movable thereon. This hydraulic apparatus 25 extends laterally beyond the carriage 29, as is evident from Fig. 6, so that in this way the roller 26 may be located against the guide member 24. The carriage 29 extends through a channel of carriage 33 which is open at the bottom, and bars 75 fixed to the carriage 33 and engaging the underside of shoulders of carriage 29 maintain the latter in position on carriage 33 while supporting carriage 29 for horizontal movement with respect to carriage 33.

Depending on the position of guide member 24, fluid under pressure will be delivered to one or the other side of the piston 30 in the cylinder 70. The parts are shown in Fig. 3 in their idle position. Assuming that fluid moves along passage 69 to the right side of piston 30, as viewed in Fig. 3, it is evident that since the piston 30 is stationary with respect to carriage 33 the carriage 29 together with the hydraulic apparatus 25 will shift to the right, as viewed in Fig. 3, while discharge of fluid from the right side of piston 30 and the supply of fluid under pressure to the left side thereof through passage 68 will cause carriage 29 and hydraulic apparatus 25 to shift to the left along piston 30, as viewed in Fig. 3.

At its front end the carriage 29 carries a housing 35 provided with suitable bearings for rotatably supporting the arbor which carries the cutting tool 7, in this case a gear cutter. Within the housing 35 this arbor is fixed to a bevel gear 76 which meshes with a bevel gear 77 carried by a shaft 78 which is turnable in a bearing supported by a stationary part of the housing 35. The shaft 78 is fixed to a gear 79 which meshes with a gear 80 fixed to a shaft 81 which is turnably carried by housing 35 and by a bering 82 of the carriage 29. The left end of shaft 81, as viewed in Figs. 3 and 4, is fixed to a gear 83 which mehes with a gear 84 (Fig. 2) turnably carried by the carriage 33 in the manner shown in Fig. 2. It will be noted that the gear 84 is longer than gear 83 so that while the carriage 29 shifts forwardly and rearwardly to cause the gear cutter 7 to cut the workpiece the gear 83 remains in mesh with the gear 84. The gear 84 is fixed to a shaft 85 rotatably supported by suitable bearings of the carriage 33, and this shaft 85 also has fixed thereto a bevel gear 86 meshing with a bevel gear 87 which is turnably carried by the carriage 33 at the bored end 88 thereof. The gear transmission 62 in addition to driving the gear 60 drives a vertically extending shaft 89 which passes upwardly through the gear 87 and the bore of end 88 of carriage 33, and this shaft 89 is splined along its length and meshes with splines in the bore of gear 87 so that the latter gear is slidable along shaft 89 while being constrained to rotate therewith. In this way a drive is transmitted from the motor 61 to the gear cutter 7 and at the same time the carriage 33 may be moved vertically and the carriage 29 may be moved horizontally with respect to the carriage 33.

Thus, Figs. 2-6 show the details of the structure schematically illustrated in Fig. 1. It is apparent that with this structure the parallelogram linkage will cause the gear cutter 7 to move through a fraction of the movement of the feeler 5 and at the same time the hydraulic mechanism applies the cutter to the workpiece with a force many times greater than that with which the yieldable means 8 urges the feeler against the template. It is apparent that the parallelogram linkage includes horizontal bar portions 90 of the U-shaped member 16 turnable about a common vertical axis and horizontal bar portions 91 of the U-shaped member 14 turnable about a second vertical axis. The bar portions 90 are respectively located opposite bar portions 91 and each pair of opposite bar portions 90 and 91 are interconnected by one of the links 22 and 23 which are in turn interconnected by the guide bar 24. Fig. 2 clearly shows how the bottom bar portion 90 is provided with the extension 18 extending beyond the bottom link 22 and adjustably carrying the member 19 so that in this way the guide bar 24 and the gear cutter 7 are shifted through a fraction of the movement of the feeler. The set screw 21 is provided to enable the bar 19 to be positioned on extension 18 in accordance with the size of the workpiece. Thus, when a workpiece of one size is exchanged for a workpiece of a different size the bar 19 may be shifted on extension 18 to enable the apparatus to operate properly.

It will be understood that each of the elements described above, or two or more together, may also find a useful application in other types of duplicating machines differing from the types described above.

While the invention has been illustrated and described as embodied in gear cutting machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Duplicating machine comprising, in combination, support means for supporting a template and work piece for movement together; feeler means engaging the template to be moved thereby in accordance with the shape of the template; cutting means for cutting the work piece; and moving means interconnecting said cutting means and feeler means for moving said cutting means in correspondence to the movement imparted to said feeler means by said template and with a force greater than that with which said feeler means engages the template, said moving means being composed of a parallelogram linkage operatively engaging said feeler means to be moved thereby and a hydraulic transmission operatively connected to said cutting means and engaging said linkage to transmit to said cutting means movement corresponding to that imparted to said hydraulic transmission by said linkage, said parallelogram linkage including a guide bar movable therewith and said hydraulic transmission including a member engaging said guide bar to be moved thereby, and said feeler means engaging said linkage at an area laterally offset with respect to said guide bar.

2. In a duplicating machine, in combination, support means; a pair of first parallel bars carried by said support means for turning movement about a first axis passing through said bars; a pair of second parallel bars carried by said support means for turning movement about a second axis passing through said second bars and parallel to said first axis, said second bars being respectively located opposite said first bars; a link interconnecting each of said first bars with the second bar opposite the same; a guide bar parallel to said axes extending between and interconnecting said links; a feeler carried by said support means for movement along a straight line perpendicular to said axes; transmission means for transmitting movement of said feeler to one of said bars so that all of said bars and said links and guide bar move in accordance with the movement of said feeler; a valve carried by said support means and having a valve-operating member engaging said guide bar so that the latter operates said valve; and hydraulic means operatively connected to said valve to be controlled thereby, whereby a cutter operated by said hydraulic means will cut a work piece in accordance with the shape of a template engaging said feeler.

3. In a duplicating machine, in combination, support means; a pair of first parallel bars carried by said support means for turning movement about a first axis passing through said bars; a pair of second parallel bars carried by said support means for turning movement about a second axis passing through said second bars and parallel to said first axis, said second bars being respectively located opposite said first bars; a link interconnecting each of said first bars with the second bar opposite the same; a guide bar parallel to said axes extending between and interconnecting said links; a feeler carried by said support means for movement along a straight line perpendicular to said axes; transmission means for transmitting movement of said feeler to one of said bars so that all of said bars and said links and guide bar move in accordance with the movement of said feeler, said transmission means including an extension of one of said bars which extends beyond the link connected to said one bar, whereby said guide bar moves in correspondence to the movement of said feeler but at a fraction of the distance through which said feeler moves; a valve carried by said support means and having a valve-operating member engaging said guide bar so that the latter operates said valve; and hydraulic means operatively connected to said valve to be controlled thereby, whereby a cutter operated by said hydraulic means will cut a work piece in accordance with the shape of a template engaging said feeler.

4. In a duplicating machine, in combination, support means for supporting a template and a workpiece; a feeler carried by said support means for movement toward and away from said template and engaging said template to be moved thereby; a carrier mounted on said support means for movement along said workpiece in a direction perpendicular to the direction of movement of said feeler; means for moving said carrier; cutting means for the workpiece mounted on said carrier for movement toward and away from said workpiece; power means mounted on said carrier for moving said cutting means and including a movable control member movable parallel to said feeler for controlling said power means to move said cutting means in accordance with movements of said movable control member; a guide means extending parallel to the direction of movement of said carrier and being connected to said feeler to be moved by the same parallel to itself between a plurality of positions in which said guide means is parallel to the direction of movement of said carrier, said control member engaging said guide means and moving along the same when said carrier is moved whereby movements of said feeler are transmitted through said guide means to said control member and to said cutting means in displaced positions of said carrier for cutting a workpiece longer than said template.

5. In a duplicating gear cutting machine, in combination, support means for supporting a template and a workpiece for turning movement about a common axis; a feeler carried by said support means for movement radial to said axis, said feeler engaging said template to be moved thereby; a carrier mounted on said support means for movement parallel to said axis; means for moving said carrier; cutting means for the workpiece mounted on said carrier for movement toward and away from said workpiece in radial direction; power means mounted on said carrier for moving said cutting means and including a movable control member movable parallel to said feeler for controlling said power means to move said cutting means in accordance with movements of said movable control member; a guide means extending parallel to said axis and being connected to said feeler to be moved by the same parallel to itself between a plurality of positions in which said guide means is parallel to said axis, said control member engaging said guide means and moving along the same when said carrier is moved parallel to said axis whereby movements of said feeler are transmitted through said guide means to said control member and to said cutting means in axially displaced positions of said carrier for cutting a workpiece longer in axial direction than said template.

6. In a duplicating gear cutting machine, in combination, support means for supporting a template and a workpiece for turning movement about a common axis; a feeler carried by asid support means for movement radial to said axis, said feeler engaging said template to be moved thereby; a carrier mounted on said support means for movement parallel to said axis; means for moving said carrier; cutting means for the workpiece mounted on said carrier for movement toward and away from said workpiece in radial direction; hydraulic operating means mounted on said carrier for moving said cutting means and including a control valve having a movable control member movable parallel to said feeler for controlling said hydraulic operating means to move said cutting means in accordance with the movements of said movable control member; a guide means extending parallel to said axis and being connected to said feeler to be moved by the same parallel to itself between a plurality of positions in which said guide means is parallel to said axis, said control member engaging said guide means and moving along the same when said carrier is moved parallel to said axis whereby movements of said feeler are transmitted through said guide means to said control member and to said cutting means in axially displaced positions of said carrier for cutting a workpiece longer in axial direction than said template.

7. In a duplicating gear cutting machine, in combination, support means for supporting a template and a workpiece for turning movement about a common axis; a feeler carried by said support means for movement radial to said axis, said feeler engaging said template to be moved thereby; a carrier mounted on said support means for movement parallel to said axis; means for moving said carrier; cutting means for the workpiece mounted on said carrier for movement toward and away from said workpiece in radial direction; power means mounted on said carrier for moving said cutting means and including a movable control member movable parallel to said feeler for controlling said power means to move said cutting means in accordance with movements of said movable control member; a pair of lever arms mounted on said support means for turning movement about an axis parallel to said axis, one of said lever arms being adjustably connected to said feeler; means urging said pair of lever arms to turn about said axis thereof for urging said feeler against the template; a guide means extending parallel to said axes and being connected at the ends thereof to said lever arms, respectively, so that said guide means moves parallel to itself between a plurality of positions in which said guide means is parallel to said axes when said feeler is moved by the template, said control member engaging said guide means and moving along the same when said carrier is moved parallel to said axis whereby movements of said feeler are transmitted through said guide means to said control member and to said cutting means in axially displaced positions of said carrier for cutting a workpiece longer in axial direction than said template.

8. In a duplicating machine, in combination, feeler means for sensing the shape of a template; first and second carrier means for carrying a pair of members one of which is a cutting member and the other of which is a work member, one of said members being movable on said first carrier means in a rectilinear movement toward and away from the other of said members; support means supporting said feeler means for rectilinear movement only in a given plane, and supporting said first carrier means for movement toward and away from said plane; first power means on said first carrier means for moving said one member, said first power means including a movable control member controlling said power means to move said one member in accordance with the movements of said movable control member; a guide means extending parallel to the direction of movement of said first carrier means, said guide means being mounted on said support means for movement between a plurality of positions parallel to itself; said movable control member engaging said guide means and moving along the same during movement of said first carrier means; a linkage member connected to said guide means and engaging said feeler means; second power means acting on said guide means for urging the same against said control member, and urging through said linkage member said feeler means against the template; and means for moving said first carrier whereby movements of said feeler means are transmitted through said linkage member and said guide means to said movable control member and to said cutting means for cutting a work member longer in axial direction than said template.

9. In a duplicating machine, in combination, feeler means for sensing the shape of a template; first and second carrier means for carrying a pair of members one of which is a cutting member and the other of which is a work member, one of said members being movable on said first carrier means in a rectilinear movement toward and away from the other of said members; support means supporting said feeler means for rectilinear movement; first power means on said first carrier means for moving said one member, said first power means including a movable control member controlling said power means to move said one member in accordance with the movements of said movable control member; linkage means movably mounted on said support means and engaging said feeler means and said movable control member so that the movements of said movable control member correspond to the movements of said feeler means; second power means acting on said linkage means for urging the same against said feeler means and against said control member whereby movements of said feeler means are transmitted to said movable control member and to said cutting means through said linkage means for cutting the work member in accordance with the shape of the template.

References Cited in the file of this patent

UNITED STATES PATENTS

| | | |
|---|---|---|
| 2,025,062 | Lilja | Dec. 24, 1935 |
| 2,069,189 | Taylor | Jan. 26, 1937 |
| 2,335,305 | Parsons | Nov. 30, 1943 |

FOREIGN PATENTS

| | | |
|---|---|---|
| 531,563 | Great Britain | Jan. 7, 1941 |